June 9, 1925.  1,540,977

F. B. BALLOU

CASING FOR VEHICLE SPRINGS

Filed Jan. 26, 1923   3 Sheets-Sheet 1

Inventor.
Franklin B. Ballou
by
Greenwood atty

June 9, 1925.
F. B. BALLOU
CASING FOR VEHICLE SPRINGS
Filed Jan. 26, 1923
1,540,977
3 Sheets-Sheet 2
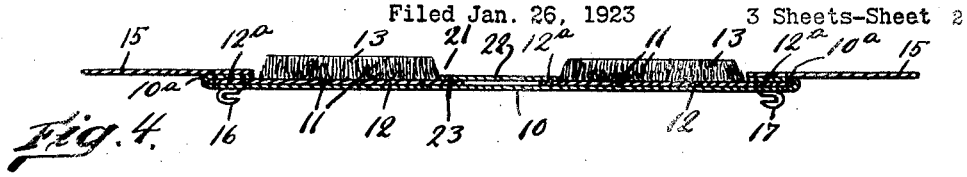
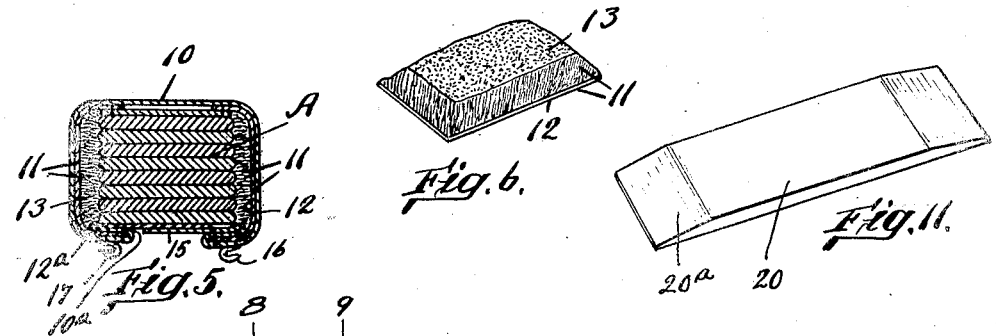
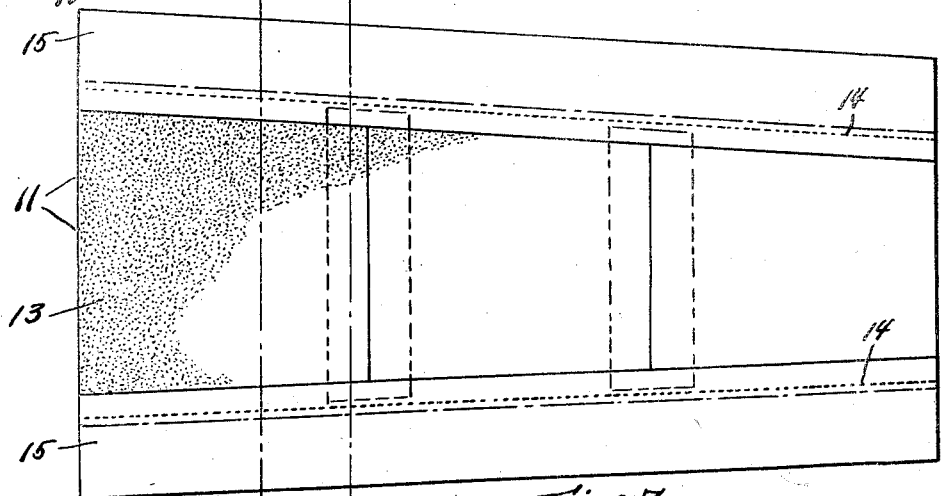
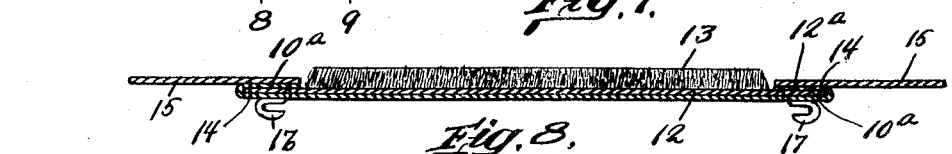
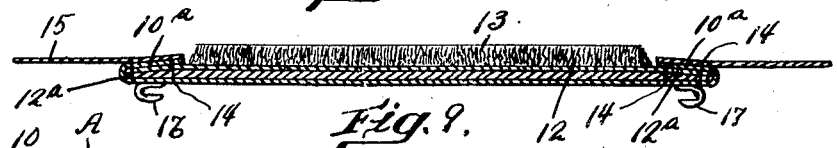
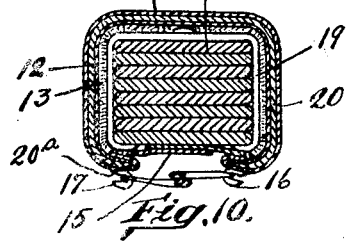
Inventor.
Franklin B. Ballou June 9, 1925. 1,540,977
F. B. BALLOU
CASING FOR VEHICLE SPRINGS
Filed Jan. 26, 1923   3 Sheets-Sheet 3
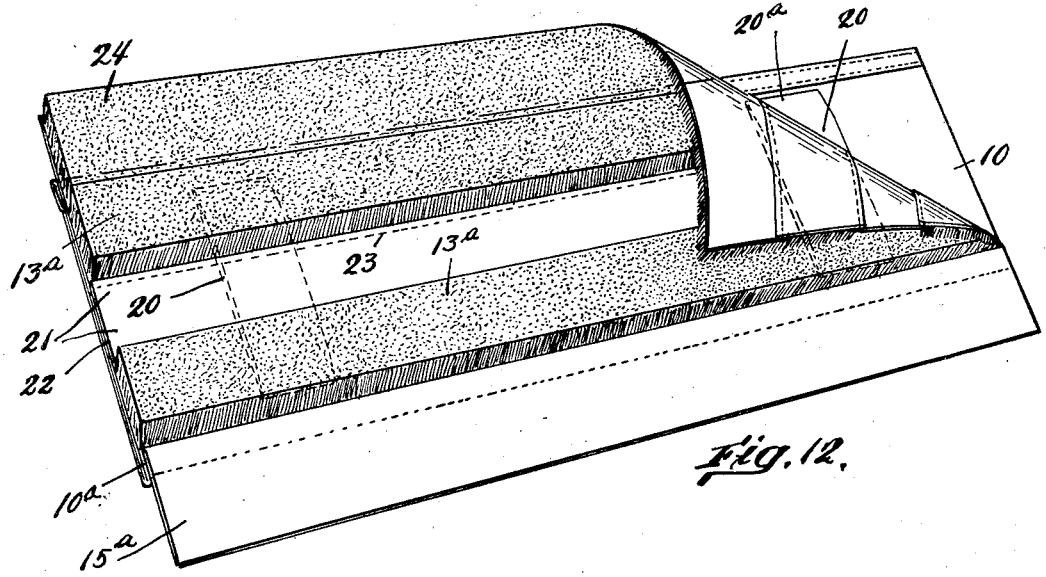
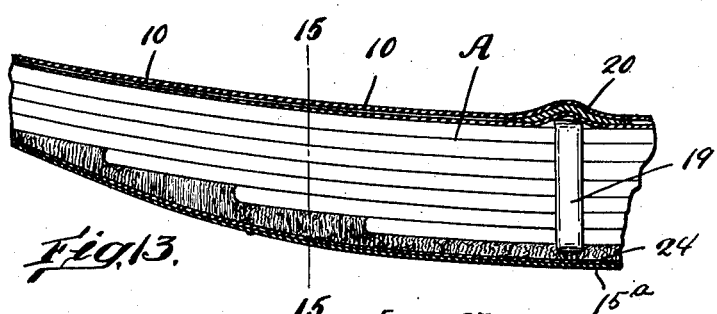
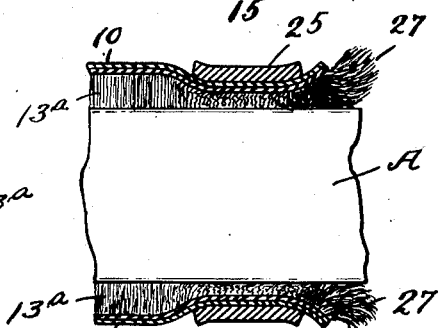
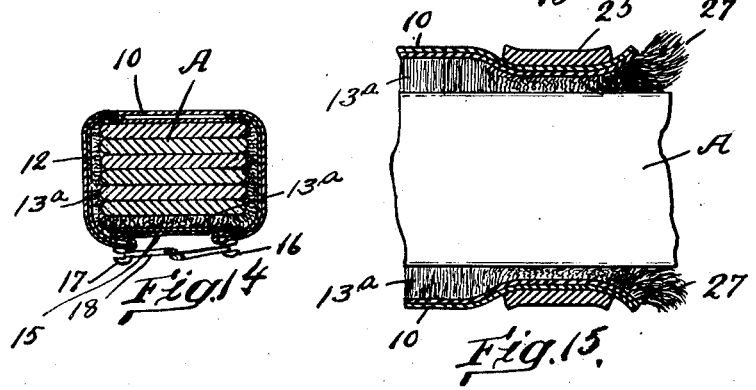
Inventor.
Franklin B. Ballou
by
atty Patented June 9, 1925.

1,540,977

UNITED STATES PATENT OFFICE.

FRANKLIN B. BALLOU, OF SALEM, MASSACHUSETTS, ASSIGNOR TO STANDARD PRODUCTS CORPORATION, OF SALEM, MASSACHUSETTS, A CORPORATION OF MASSACHUSETTS.

CASING FOR VEHICLE SPRINGS.

Application filed January 26, 1923. Serial No. 614,969.

*To all whom it may concern:*

Be it known that FRANKLIN B. BALLOU, a citizen of the United States, residing in Salem, in the county of Essex and State of Massachusetts, have invented an Improvement in Casings for Vehicle Springs, of which the following is a specification.

This invention relates to covers or casings adapted to enclose the springs of vehicles, and particularly automobiles, whereby to protect the springs from dirt and moisture and maintain a supply of lubricant for the leaves of the spring.

Spring covers or casings have been suggested in which a pad of absorbent material is arranged to be placed in contact with the spring; and said pad has usually been made of felt or other material characterized by being composed of loose fibres matted relatively solidly together in indiscriminate order and forming a plurality of irregularly disposed and unconnected pores or channels among the fibres. The matted porous material has usually been relatively hard and unyielding and the fibres thereof have been mainly of a grease repellent nature so that the lubricant was contained mainly in the pores and unconnected channels between the fibres and not in the fibres themselves. By reason of the relatively hard texture of the matted material, the engagement thereof with the spring is likely to be irregular and imperfect and, due to the grease repellent nature of the fibres composing the material, and the fact that the channels are mainly unconnected or isolated so that there is not a free passage from the more remote portions of the material to the surface thereof, these devices have not proved as effective as might be supposed in lubricating the spring.

It is an object of this invention to provide a spring cover having a lubricant-containing medium characterized by a villous material having a pile of loose and flexible fibres on one face thereof which are adapted to be placed in contact with the spring; and said cover is adapted to be drawn snugly about the spring whereby the spring will be embedded in the soft fibre pile so that the fibres are brought and held in contact with substantially all portions of the spring covered by the lubricant-containing material, and the fibres will fill the irregularities or indentations between the various leaves of the spring whereby to conduct lubricant to the bearing surfaces between the spring leaves.

It is an object of this invention to make the villous material of fibres which are inherently of a greasy nature, and thereby grease absorbent, whereby the lubricant will be held in the fibres themselves as well as between and among the fibres; and inasmuch as the fibres are arranged in an orderly manner and mainly parallel to each other and perpendicular to the face of the spring, the lubricant retained in the most remote portions of the material may be conducted directly to the outer surface thereof.

It is a further object of this invention to utilize shearling as the above described villous material. Shearling is the hide or skin of the sheep with the hair or wool retained thereon. Wool is inherently greasy and therefore grease absorbent, and consequently shearling is well adapted to absorb and retain, in the fibres themselves, and among and between the fibres of the wool, the lubricant applied to the shearling, and conduct the lubricant to the spring.

A yet further object of the invention is to provide a spring cover having a longitudinal recess therein which is adapted to receive the spring so that the cover may readily be applied thereto and held in proper position, while the cover is laced or otherwise secured in position about the spring.

A further object of this invention is to provide improved means for sealing the ends of the casing against the entrance of dirt and moisture.

A yet further object is generally to improve the construction of casings for vehicle springs.

Fig. 4 is a transverse section along line 4—4 of Fig. 2.

Fig. 5 is a transverse section along line 5—5 of Fig. 1.

Fig. 7 is an inside plan view of a modified form of casing.

Figure 1:
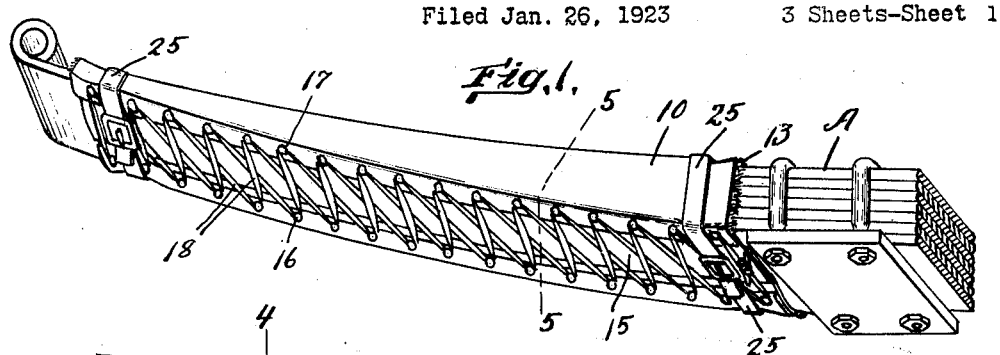
Fig. 1 is a perspective view of a casing embodying the invention, applied to an automobile spring.
Figure 2:
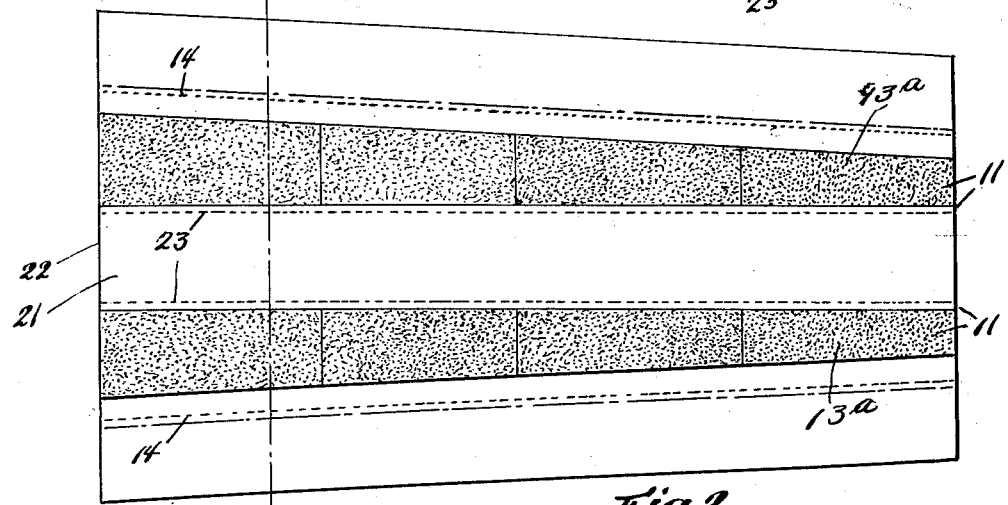
Fig. 2 is an inside plan view of the casing.
Figure 3:
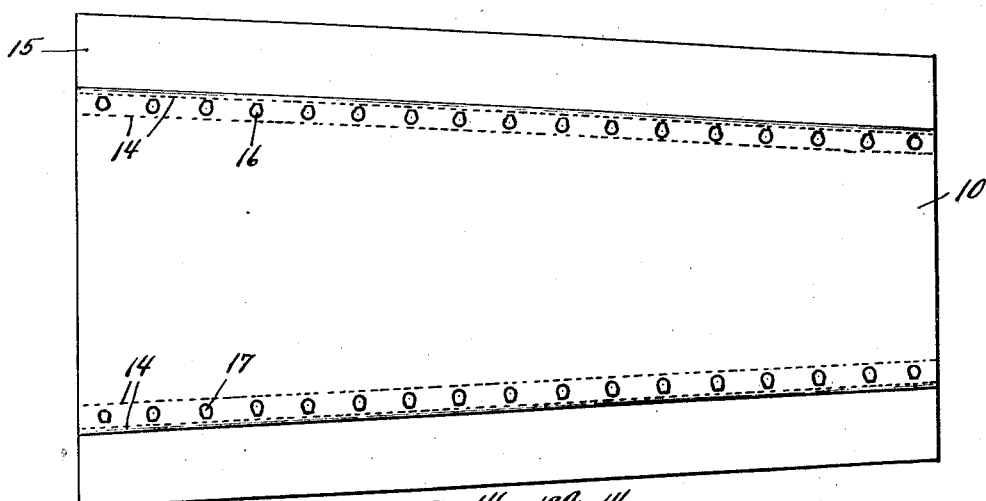
Fig. 3 is an outside plan view of the casing.
Figure 6:
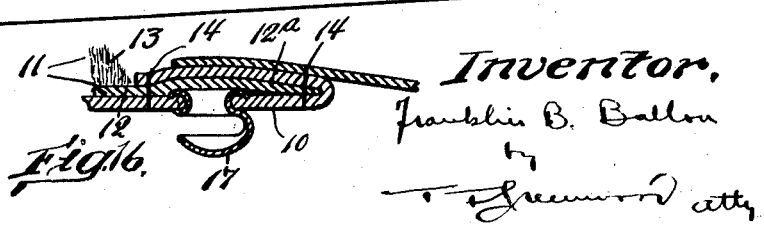
Fig. 6 is a detail of the shearling lining.

Figs. 8 and 9 are transverse sections along lines 8—8 and 9—9 respectively of Fig. 7.

Fig. 10 is a transverse section of the casing of Fig. 7 applied to a vehicle spring and illustrating more particularly the relation of the reinforcing member to a spring clip.

Fig. 11 is a perspective view of a reinforcing member for the casing of Fig. 7.

Fig. 12 is a perspective view of a modified form of casing.

Fig. 13 is a longitudinal section of the casing of Fig. 12 applied to a vehicle spring and illustrating particularly the manner in which the shearling lining is maintained in contact with the bottom surface of the spring.

Fig. 14 is a section along line 15—15 of Fig. 13.

Fig. 15 is a sectional detail illustrating the manner in which the ends of the casing are compressed against the spring whereby to force the wool fibres outwardly and provide a sealing dam for the end of the casing.

Fig. 16 is a sectional detail illustrating the manner in which the opening through the tubular hook is sealed.

As here shown, the casing embodying my invention is adapted to enclose the spring A which may well be an automobile spring of the multi-leaf type. Preferably, although not necessarily, the casing includes an outer flexible cover sheet 10 which preferably is made of suitable water proof and grease and oil proof material; or it may be made of material which is not inherently grease and water proof but may be made so by suitable treatment as by the application of a suitable protective coating thereto. For instance, the outer cover sheet may be made of artificial leather or it may be made of leather, which preferably is treated to render it water and grease proof. Said outer sheet is adapted to enclose and support an inner flexible lubricant-retaining lining 11 which may be, and preferably is, co-extensive with the length of the outer protective sheet 10. Said lining is adapted to receive a lubricant as an oil or grease, and is adapted to be placed in contact with the spring, and retained in position, whereby to maintain the supply of lubricant in contact with the springs so that the bearing surfaces between the spring leaves may be kept constantly lubricated.

In accordance with this invention, said inner lining comprises a villous material characterized by having a more or less solid and substantial backing or body which is provided with a pile or nap of closely spaced fibres on one face thereof preferably integrally formed with said body and also preferably extended substantially perpendicular to said face.

It is also an object of this invention to provide shearling as the villous material. Shearling is the hide of the sheep with the wool retained thereon, and shearling is particularly adapted for the purpose of this invention as will be set forth further on.

As here shown, the shearling comprises the hide or body 12 having the wool fibres or hairs 13 on one face thereof. The lining may be made of one or a plurality of pieces of shearling which may be united to the outer cover sheet 10 in any suitable or desirable manner but, preferably, the outer edges of the shearling is skived off to provide the wool-free side edges 12$^a$. The outer sheet 10 may have its opposite outer edges 10$^a$ reflexed over and upon the aforesaid skived edges, as shown, and lines of stitching 14 may be passed through said reflexed edge portions and the skived edges of the shearling and the body portion of the outer sheet whereby to unite the shearling and the outer sheet fixedly together. The middle portion of the shearling lining may also be secured to the middle portion of the outer sheet by suitable means and preferably by an adhesive, if desired, although it is not essential.

In that embodiment of the invention illustrated in Figs. 7, 8 and 9, the shearling is adapted to cover substantially the entire inner face of the outer sheet 10 in such a manner that when the casing is wrapped about the spring in the manner illustrated in Fig. 10, the shearling is brought into contact with the top and opposite side portions of the spring and thereby is in position to supply lubricant to the bearing surfaces of the spring leaves from the opposite sides of the spring. As thus arranged, the side edges of the casing are adapted to be drawn and secured together on the underside of the spring. If desired, however, the casing may be relatively reversed on the spring in an obvious manner, not shown, and the edges of the casing secured together on top of the spring. There are certain advantages in this particular arrangement which will be described further on in connection with a modified form of spring cover.

Preferably flaps comprising strips of suitable material 15, which also may be water and oil proof, are secured to the lateral edges of the casing by one or more of the lines of stitches 14 and said flaps are adapted to overlap under the proximate side edges of the casing when the casing is secured in position about the spring whereby to exclude dirt and moisture.

The fastening means for the casing may include the rows of tubular hooks 16 and 17 which are or may be attached to the outer edge portions of the outer casing 10 in more or less the usual manner. A flexible lacing 18 is adapted to be passed alternately through hooks of the opposed rows whereby to secure the casing in position on the spring. Said hooks 16 and 17 are or may be constructed in more or less eyelet form as is customary and the skived edges 12ª of the shearling lining are adapted to lie over the openings through said hooks and seal said openings against the entrance of moisture and dirt and also against the escape of lubricant.

This construction is illustrated more particularly in Fig. 16.

Springs, and especially automobile springs, are usually provided with one or more spring clips 19 disposed along the length of the springs for the purpose of retaining the spring leaves in superposition against lateral displacements.

It is one of the objects of this invention to provide the casing with reinforcements at those portions thereof adapted to lie over the spring clips. For this purpose, the casing may be provided with one or more leather or other suitable reinforcing members 20 which are adapted to be positioned between the hide or body 12 of the shearling and the outer sheet 10 and said reinforcing members may have their opposite ends skived off to provide thin edged portions 20 through which the lines of stitching 14 are or may be passed whereby to secure the reinforcing members permanently in position.

In Figs. 2 through 5, is illustrated a modified form of casing which in some respects is preferable to the casing above described. The casing illustrated in said figures is or may be constructed in substantially the same manner as before with the exception that, instead of a single broad strip of shearling, two narrower strips of shearling 13ª are employed, whereby a central passage or recess 21 is formed or provided between the aforesaid strips which is adapted to receive the top leaf of the spring. With this arrangement, the casing may be the more easily secured in position about the spring since the side strips of shearling form abutments which tend to prevent the casing from moving laterally on the spring as it is being laced up. The inner edges of the shearling strips 13ª may be skived off to remove the wool as before and said inner edges may be secured directly to the outer cover sheet 10 or, and preferably, a strip of suitable material 21, as leather or artificial leather, may be secured to said skived edges by the lines of stitching 23. As thus arranged, the casing is adapted to be wrapped about the spring in the manner illustrated in Fig. 5. The shearling strips 13ª are adapted to lie over the sides of the spring and bear against and be in contact with the spring leaves and thereby serve to convey lubricant to the contacting surfaces thereof. Flaps 15 may be applied to this modification as before and the construction may otherwise be the same as that above described.

The usual leaf spring construction comprises a series of spring leaves of graduated length superposed one upon the other with the shorter leaves at the bottom and the longer leaves at the top of the spring. It is a further object of this invention to provide means for applying lubricant to the lower faces of the spring leaves, where the relative motion between the leaves is the greatest, whereby the better to lubricate the spring. Fig. 12 illustrates a modified form of casing adapted for this purpose. The casing is or may be mainly similar in construction to that illustrated in Fig. 2 with the addition that one of the flaps 15 may be replaced by a shearling strip 24, which may be a separate shearling strip, or it may be integral with and comprise a lateral extension of one of the shearling strips 13ª. Said strip 24 is adapted to extend beyond the outer protective sheet 10 and form one of the flaps of the casing; and the casing, in this modification, may be provided with a single plain flap 15ª as above described, extended from the opposite side of the casing. With this arrangement, said strip 24 is held in contact with the lower face of the spring as illustrated in Fig. 13, and the lubricant contained in said strip is applied in a most effective manner to the bearing surfaces between the spring leaves.

In the modification illustrated in Fig. 12, the shearling lining is preferably attached to the outer sheet 10 only at that edge to which is secured the plain flap 15ª whereby to admit of the insertion of suitable reinforcing members 19ᵇ between the shearling lining and the outer strip 10 and thereby provide the casing with reinforcing members may be secured to the casing in any suitable manner and are preferably adhesively secured thereto. The back portion of the hide of said shearling strip 23 is preferably rendered water and grease proof by the application thereto of a suitable protective coating as, for instance, a coating of cellulose acetate whereby to prevent the entrance of moisture to the spring and the escape of lubricant from the casing. Said casing is adapted to be attached to the spring by a suitable lacing as illustrated in Fig. 1.

The ends of the casing are adapted to be compressed firmly against the body of the spring by straps 25 whereby to secure the casing against longitudinal movement on the spring and also to seal the ends of the casing against entrance of moisture and escape of lubricant. The straps preferably are not secured to the casing but are wrapped about the casing between a pair of hooks on each row thereof; and said hooks serve to prevent the longitudinal displacement of the straps. The action of the straps is to compress the shearling against the body of the spring in such a manner that the edge portion of the shearling is forced outward as illustrated at 27, Fig. 14, whereby to provide a dam or barrier which may serve to prevent the entrance of dirt and moisture into the interior of the casing.

The shearling lining is adapted to be impregnated with or contain a suitable lubricant as, for instance, a heavy oil or a soft grease, as vaseline which is applied to the lining in such a manner that the lubricant is contained in and among the wool fibres. Due to the inherent characteristics of the shearling, the lubricant will also be absorbed by the fibres of the wool.

The fibres of the shearling are mainly perpendicular to the hide 12 thereof, and, when the casing is in position about the spring, the fibres are or may be disposed mainly perpendicularly to the side edges of the spring and therefor mainly parallel to the bearing surfaces between the spring leaves. As thus arranged, the fibres of the shearling are well adapted to give up their lubricant to the bearing surfaces as the spring flexes and thereby alternately compresses and releases the fibres. The action of the shearling in this respect is quite different than the action of the usual porous and fibrous substance, as felt, employed for this purpose. With felt, for instance, and as above set forth, the fibres are matted and compressed together in indiscriminate order and lie mainly along the length of the strip of felt, and, therefore, lie across the bearing surfaces between the spring leaves. Consequently, the fibres are not in the best position to give up the lubricant to the spring and, in fact, the transverse fibres of the felt immediately adjacent the spring may interpose a substantial resistance to the movement of the lubricant from the outermost portions of the felt toward the spring. Obviously this is not the case with shearling.

While I have here shown the casing as comprising the shearling lining and an outer protective sheet, yet I may dispense with the outer protective sheet, inasmuch as the hide or body 11 of the shearling may serve all purposes of the protective sheet. In this event, I prefer to render the hide of the shearling impervious to water or grease in any suitable manner as by applying a suitable protective coating thereto as in the same manner as described in connection with the flap 23 of the modification illustrated in Fig. 12.

The invention may be otherwise modified without departing from the spirit of the invention.

I claim:

1. A casing for a vehicle spring comprising a flexible sheet of villous material having a fibre pile on one face thereof and adapted to be wrapped about the spring with the pile in contact with the spring.

2. A casing for a vehicle spring comprising a sheet of hair-bearing leather adapted to be disposed with its hairs in contact with the spring.

3. A casing for a vehicle spring comprising a flexible sheet of hair-bearing leather adapted to be wrapped about the spring with the hairs thereof disposed in contact with the spring.

4. A casing for a vehicle spring comprising a flexible sheet of shearling adapted to be wrapped about the spring with the wool thereof disposed in contact with the spring.

5. A casing for a vehicle spring comprising a flexible sheet of material having a pile of fibres which are extended substantially perpendicularly from a face thereof, said sheet adapted to be wrapped about the spring with the fibres thereof disposed in contact with the spring.

6. A casing for a vehicle spring comprising the combination of a flexible sheet of water-proof material, and a flexible sheet of villous material having a fibre pile on one face thereof secured to said waterproof sheet with the fibre pile outermost, said casing adapted to be wrapped about the spring with the fibre pile in contact with the spring.

7. A casing for a vehicle spring comprising the combination of a flexible sheet of waterproof material, and a flexible sheet of hairbearing leather secured to said waterproof sheet, said casing adapted to be wrapped about the spring with the hair disposed in contact with the spring.

8. A casing for a vehicle spring comprising the combination of a flexible sheet of waterproof material, and a flexible sheet of shearling secured to said waterproof sheet with the wool face thereof outermost, said casing adapted to be wrapped about the spring with the wool in contact with the spring.

9. A casing for a vehicle spring comprising the combination of a flexible sheet of waterproof material, a flexible sheet of shearling superimposed on said water-proof sheet with the wool thereof outermost, the lateral edges of said shearling being skived, and securing means connecting the skived edges of said shearling and the waterproof sheet.

10. A casing for a vehicle spring comprising the combination of a flexible sheet of waterproof material, a flexible sheet of villous material having a fibre pile on one face secured to said waterproof sheet with the fibre pile outermost, said villous sheet having the fibre pile on the lateral edges reflexed over and upon the skived edges of said villous material, and a line of stitching passed through the edges of said villous material and waterproof sheet.

11. A casing for a vehicle spring comprising the combination of a flexible sheet of waterproof material, a flexible sheet of shearling superimposed on said waterproof sheet with the wool thereof outermost, a lateral edge of said shearling being skived to remove the wool thereat, and a lateral edge of said waterproof sheet reflexed over and upon said skived edge of the shearling and a line of stitching passed through the superposed edges of said shearling and waterproof sheet.

12. A casing for a vehicle spring comprising the combination of a flexible sheet of waterproof material, a flexible sheet of shearling superimposed on said waterproof sheet with the wool thereof outermost, a lateral edge of said shearling being skived, securing means connecting the skived edge of said shearling and the waterproof sheet, and a flap secured to a lateral edge of the casing.

13. A casing for a vehicle spring comprising the combination of a flexible sheet of waterproof material, a flexible sheet of shearling superimposed on said waterproof sheet with the wool thereof outermost, the lateral edges of said shearling being skived, securing means connecting the skived edges of said shearling and the waterproof sheet, a flap secured to a lateral edge of the casing, and rows of hooks secured to and extended above the outer face of the waterproof sheet at the lateral edges thereof.

14. A casing for a vehicle spring comprising the combination of a flexible sheet of material adapted to be wrapped about the spring, and a flexible wear-receiving member extended transversely across and secured to said sheet, said wear receiving member having a width approximating that of a retaining-clip of the spring and disposed on the casing to overlie the clip.

15. A casing for a vehicle spring comprising the combination of an outer flexible sheet, an inner flexible sheet, both adapted to be wrapped about the spring, and a flexible wear-receiving member disposed between and extended transversely across said sheets and secured to one of them, said wear-receiving member having a width approximating that of a retaining-clip of the spring and disposed on the casing to overlie the clip.

16. A casing for a vehicle spring comprising the combination of a flexible sheet of waterproof material, a flexible sheet of shearling superimposed on said waterproof sheet with the wool thereof outermost, the lateral edges of said shearling being skived, the lateral edges of said waterproof sheet reflexed upon said skived edges of the shearling, a flexible wear-receiving member disposed between and extended transversely across said water-proof sheet and said shearling sheet, and a line of stitching passed through the edges of said shearling and waterproof sheets and wear-receiving member.

17. A casing for a vehicle spring comprising the combination of a flexible sheet of material wrapped about the spring, a sheet of shearling disposed within said casing and secured to said flexible sheet with the wool surface in contact with the spring, and straps secured about the ends of the casing whereby to compress the wool thereat outwardly beyond the ends of the casing.

18. A casing for a vehicle spring comprising the combination of a cover adapted to fit over and conform to the spring, and opposed lubricating pads arranged along the length of the casing adapted to form a casing-aligning recess between them in which the spring is received and engage the opposite sides of the spring.

19. A casing for a vehicle spring comprising the combination of a flexible cover which is adapted to enclose the spring and conform thereto, and two opposed lubricating pads within said cover and extending along the length thereof arranged to lie in contact with the opposite sides of the spring and provide a casing-aligning recess between them in which the top of the spring is adapted to be received.

20. A casing for a vehicle spring comprising the combination of a flexible cover which is adapted to enclose the spring and conform thereto, and two opposed lubricating pads disposed within said cover and extended along the length thereof arranged to lie in contact with the opposite sides of the spring and provide a casing-aligning recess between them in which the top of the spring is adapted to be received, one of said pads also arranged to extend under and lie in contact with the major portion of the bottom of the spring.

21. A casing for a vehicle spring comprising the combination of a flexible cover which is adapted to enclose the spring and conform thereto, and two opposed lubricating pads disposed within said cover and extended along the length thereof arranged to lie in contact with the opposite sides of the spring and provide a casing-aligning recess between them in which the top of the spring is adapted to be received, one of said pads extended beyond a side edge of said cover and arranged to extend under and lie in contact with the major portion of the bottom of the spring and a flap secured to and extended laterally beyond the other side edge of said cover and overlie said pad.

22. A casing for a vehicle spring comprising the combination of a cover adapted to enclose the spring and conform thereto, and two spaced and opposed shearling pads extended longitudinally of the cover and arranged to engage the sides of the spring and provide a spring-receiving and casing-aligning recess between them.

23. A casing for a vehicle spring comprising the combination of a cover adapted to enclose the spring and conform thereto, and two spaced and opposed shearling pads extended longitudinally of the cover and arranged to engage the sides of the spring and provide a spring-receiving and casing-aligning recess between them, said shearling pads having skived side edges and lines of stitching passed through said skived side edges and the cover.

24. A casing for a vehicle spring comprising the combination of a cover adapted to enclose the spring and conform thereto, and two spaced and opposed shearling pads extended longitudinally of the cover and arranged to engage the sides of the spring and provide a spring-receiving and casing-aligning recess between them, said shearling pads having skived side edges, a flexible strip received on the inner side edges lying in the recess, and lines of stitching passed through said flexible strip and the skived edges of the shearling, whereby to unite the opposed shearling pads, and also through the outer skived edges of the shearling and the cover, whereby to unite said shearling pads and the cover.

In testimony whereof I have signed my name to this specification.

FRANKLIN B. BALLOU.